(12) United States Patent
Kitajima et al.

(10) Patent No.: US 9,729,262 B2
(45) Date of Patent: Aug. 8, 2017

(54) OPTICAL RECEIVER AND METHOD OF OPTICAL RECEPTION

(71) Applicant: FUJITSU LIMITED, Kawasaki-shi, Kanagawa (JP)

(72) Inventors: Hiroyuki Kitajima, Oyama (JP); Takashi Kuwabara, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 20 days.

(21) Appl. No.: 14/606,490

(22) Filed: Jan. 27, 2015

(65) Prior Publication Data
US 2015/0249506 A1 Sep. 3, 2015

(30) Foreign Application Priority Data
Mar. 3, 2014 (JP) .................. 2014-040874

(51) Int. Cl.
| | |
|---|---|
| *H04J 3/16* | (2006.01) |
| *H04J 3/08* | (2006.01) |
| *H04J 3/06* | (2006.01) |
| *H04J 3/07* | (2006.01) |
| *H04J 3/14* | (2006.01) |
| *H04B 10/00* | (2013.01) |

(52) U.S. Cl.
CPC ............ *H04J 3/1652* (2013.01); *H04B 10/00* (2013.01); *H04J 3/0623* (2013.01); *H04J 3/07* (2013.01); *H04J 3/085* (2013.01); *H04J 3/14* (2013.01); *H04J 3/167* (2013.01)

(58) Field of Classification Search
CPC .... H04J 3/14; H04J 3/0623; H04J 3/07; H04J 3/085; H04J 3/167; H04B 10/00
USPC .......................................................... 398/202
See application file for complete search history.

(56) References Cited

U.S. PATENT DOCUMENTS

| | | | | |
|---|---|---|---|---|
| 6,888,799 | B2 * | 5/2005 | Matsumoto ............... | H04J 3/14 370/241 |
| 7,830,808 | B2 * | 11/2010 | Takeuchi ................ | H04J 3/085 370/248 |
| 8,102,851 | B1 * | 1/2012 | Mandin ............... | H04L 25/4975 370/390 |
| 8,582,582 | B2 * | 11/2013 | Valiveti ............... | H04L 63/0272 370/392 |
| 8,848,747 | B2 * | 9/2014 | Zeng ....................... | H04J 3/14 370/509 |

(Continued)

FOREIGN PATENT DOCUMENTS

JP    2012-65342    3/2012

*Primary Examiner* — David Payne
*Assistant Examiner* — Tanya Motsinger
(74) *Attorney, Agent, or Firm* — Fujitsu Patent Center (57) ABSTRACT

An optical receiver includes a reception module, a first detector, a second detector, a shift module, a first extraction module, and a second extraction module. The reception module receives a frame. The first detector detects a head position of a first layer, the head position being included in the frame. The second detector detects a head position of a second layer, the head position being included in the frame. The shift module shifts the frame so that the head position of the first layer and the head position of the second layer are located at respective predetermined positions. The first extraction module extracts a header of the first layer from the frame after the frame is shifted. The second extraction module extracts a header of the second layer from the frame after the frame is shifted.

7 Claims, 8 Drawing Sheets

(56) References Cited

U.S. PATENT DOCUMENTS

| | | | | |
|---|---|---|---|---|
| 2002/0012141 A1* | 1/2002 | Traverso | H04J 3/1611 | 398/179 |
| 2005/0135805 A1* | 6/2005 | Cho | H04B 10/00 | 398/27 |
| 2007/0263646 A1* | 11/2007 | Matsui | H04J 3/14 | 370/404 |
| 2008/0159156 A1* | 7/2008 | Takeuchi | H04J 3/085 | 370/248 |
| 2010/0150162 A1* | 6/2010 | Nakayama | H04L 12/437 | 370/400 |
| 2012/0070159 A1* | 3/2012 | Ishihara | H04B 10/07951 | 398/202 |
| 2012/0134674 A1* | 5/2012 | Shin | H04J 3/0623 | 398/58 |
| 2012/0148240 A1* | 6/2012 | Ceccarelli | H04L 45/50 | 398/45 |
| 2012/0251119 A1* | 10/2012 | McNicol | H04J 14/02 | 398/91 |
| 2013/0028602 A1* | 1/2013 | Fu | H04L 45/10 | 398/58 |
| 2013/0202294 A1* | 8/2013 | Fu | H04J 3/1652 | 398/45 |
| 2013/0216222 A1* | 8/2013 | Fu | H04J 3/1652 | 398/45 |
| 2013/0308715 A1* | 11/2013 | Nam | H04B 7/0469 | 375/267 |
| 2014/0036926 A1* | 2/2014 | Nishida | H04L 49/25 | 370/401 |
| 2014/0186019 A1* | 7/2014 | Chaudhary | H04B 10/032 | 398/1 |
| 2014/0226981 A1* | 8/2014 | Kuwabara | H04J 3/1652 | 398/65 |
| 2014/0314402 A1* | 10/2014 | Moynihan | H04J 3/14 | 398/17 |
| 2015/0249506 A1* | 9/2015 | Kitajima | H04J 3/1652 | 398/202 |
| 2016/0142796 A1* | 5/2016 | Mukhopadhyay | H04Q 11/0003 | 398/45 |

* cited by examiner

OPTICAL RECEIVER AND METHOD OF OPTICAL RECEPTION

CROSS-REFERENCE TO RELATED APPLICATION

This application is based upon and claims the benefit of priority of the prior Japanese Patent Application No. 2014-040874, filed on Mar. 3, 2014, the entire contents of which are incorporated herein by reference.

FIELD

The embodiments discussed herein are related to an optical receiver and a method of optical reception.

BACKGROUND

There has been the case that in optical transport network (OTN) transmission specified in International Telecommunication Union-Telecommunication Standardization Sector (ITU-T), multiplexing of frames is performed in order to achieve faster optical transmission. That is, there has been the case that in an optical channel data unit (ODU) frame that constitutes an optical channel transport unit (OTU) frame, lower-layer ODU frames are, in addition to a client signal, further multiplexed in a payload (see Japanese Laid-open Patent Publication No. 2012-65342). Hereinafter, such a low-layer ODU frame is described as a lower order (LO)-ODU frame in distinction from a higher order (HO)-ODU frame in which the low-layer frame is stored.

For example, when an optical receiver divides a client signal of 400 Gbps Ethernet (registered trademark) (400 GbE) into four 100-Gbps signals and transmits the signals, the above-mentioned client signal is first mapped to an LO-ODU frame of ODU4Cn (n=4) that is constituted of four lanes. Thereafter, the optical receiver maps the above-mentioned client signal to an HO-ODU frame of ODU4Cm (m=4) thus generating an OTU frame capable of high speed transmission at 400 Gbps. In the OTN transmission, signals are hierarchized and the bit rates of the respective layers differ from each other and hence, signal processing for maintenance, monitoring, or the like is usually performed for each layer.

Furthermore, the optical receiver refers to the overhead (OH) of the OTU frame that has been received to perform the signal processing for maintenance, monitoring, or the like (hereinafter, referred to as "OH processing"). Although the OH processing is achieved by a device (an application specific integrated circuit (ASIC), field programmable gate array (FPGA), or the like) in the optical receiver, the device in the optical receiver does not operate with the clock (100 GHz, for example) that follows 100 Gbps. Accordingly, the device in the optical receiver performs the OH processing with respect to the OTU frame by parallel processing to be performed with a clock on the order of 200 MHz to 400 MHz.

Figure 7:
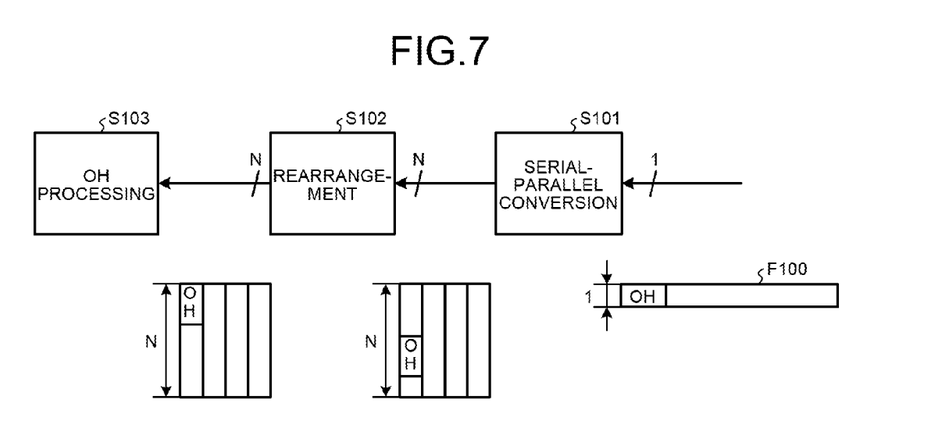
FIG. 7 is a view illustrating a manner that data is rearranged in advance of OH processing of an OTU frame.

FIG. 7 is a view illustrating a manner that data is rearranged in advance of the OH processing of the OTU frame. As illustrated in FIG. 7, an OTU frame F100 is received and thereafter, serial-parallel conversion of the OTU frame F100 is performed (S101). However, since the OTU frame F100 is received continuously, an OH to be processed is not necessarily located on the head side of data depending on the timing of conversion. As a result, it is difficult to specify the position of the OH. Accordingly, the rearrangement (shift) of the OTU frame F100 is performed so that the OH to be processed always appears at a predetermined position (the first bit of the head part, for example) of a parallel signal (S102). After the rearrangement of the OTU frame F100, OH position specifying processing and the OH processing are performed with respect to the OTU frame F100 as a parallel signal (S103).

Figure 8:
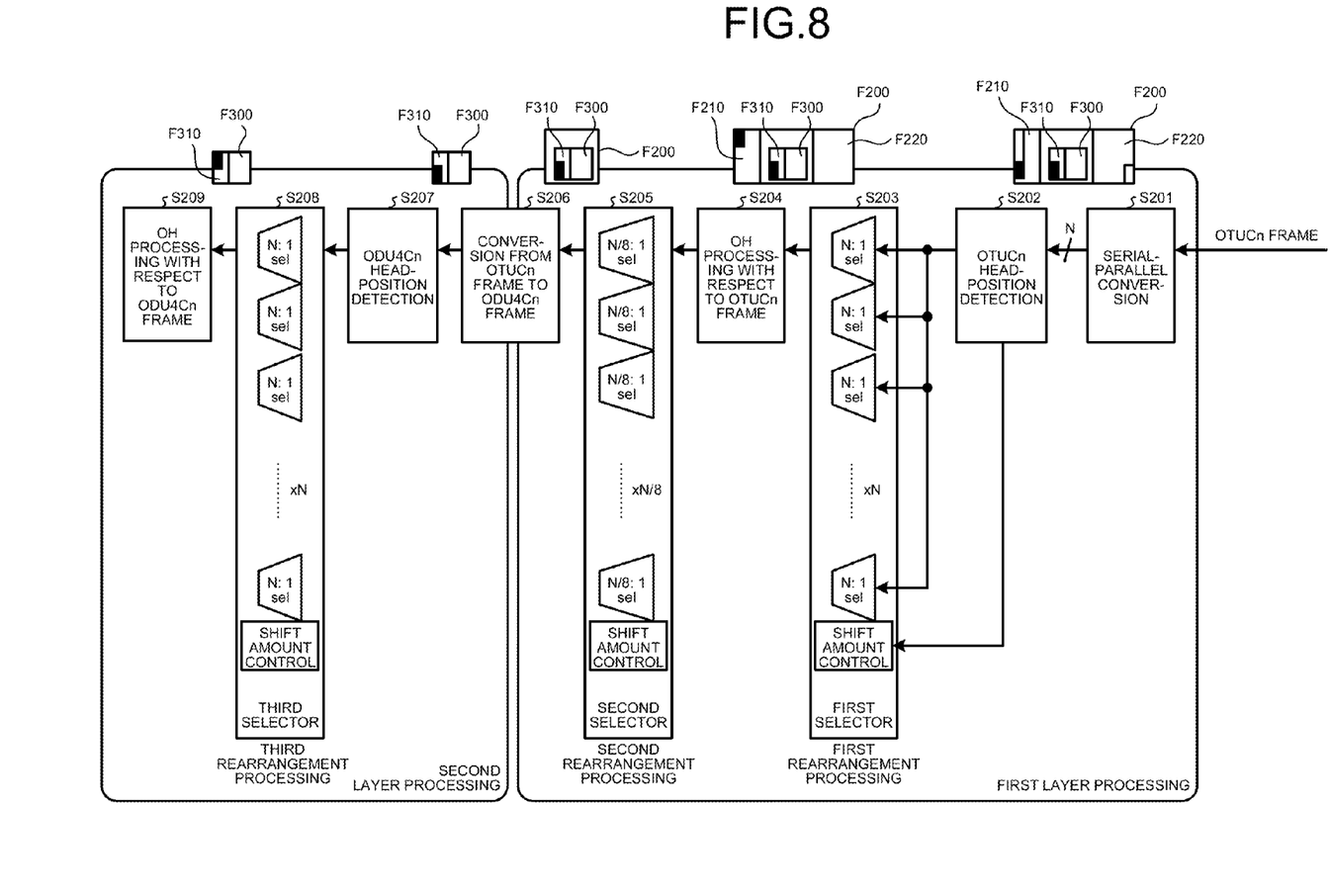
FIG. 8 is a view for explaining frame processing performed for each layer in a related technique.

However, in related frame processing, rearrangement processing is separately performed for each layer and hence, there has been a drawback that the scale of a circuit is increased. Hereinafter, the explanation is specifically made with reference to FIG. 8. FIG. 8 is a view for explaining the frame processing performed for each layer in a related technique. As illustrated in FIG. 8, in the frame processing performed on the side of demapping, the above-mentioned rearrangement processing of data is performed for each layer.

In FIG. 8, an OTUCn frame F200 is a first-layer frame, and an ODU4Cn frame F300 is a second-layer frame. The OTUCn frame F200 has an OH part F210 and a forward error correction (FEC) part F220 in addition to a payload part, and the ODU4Cn frame F300 having the OH part F310 is multiplexed in the payload part. Here, each of filled portions (black portions) of the OTUCn frame F200 and the ODU4Cn frame F300 constitutes a frame alignment signal (FAS) that indicates the head position of each frame.

The serial-parallel conversion of the OTUCn frame F200 received by the optical receiver is performed in order to lower a clock rate (S201) and thereafter, the head position of the OTUCn frame F200 is detected (S202). First rearrangement processing is performed at S203. That is, in order to easily perform successive OH processing with respect to the OTUCn frame F200, the OTUCn frame F200 is rearranged so that the above-mentioned head position is located at the head part (most significant bit (MSB), for example) of parallel data. Furthermore, the OH processing with respect to the OTUCn frame F200 of the first layer is performed (S204).

In second rearrangement processing, the OH part F210 and the FEC part F220 are deleted from the OTUCn frame F200 and thereafter, in order to easily perform frame conversion processing between layers later, the OTUCn frame F200 is rearranged so that the parallel data that constitutes the payload part is formed in a rectangle shape (S205, S206). Next, the ODU4Cn frame F300 is extracted from the rearranged OTUCn frame F200.

In the same manner as S202 above, the head position of the ODU4Cn frame F300 is detected in the extracted ODU4Cn frame F300 at S207. Third rearrangement processing is performed at S208. That is, in order to easily perform successive OH processing with respect to the ODU4Cn frame F300, the ODU4Cn frame F300 is rearranged so that the above-mentioned head position is located at the head part (MSB, for example) of the parallel data. In the same manner as S204 above, the OH processing with respect to the ODU4Cn frame F300 of the second layer is performed at S209.

As mentioned above, in the related frame processing, the rearrangement processing is performed separately for each layer; that is, each of the first and second layers. The rearrangement processing is performed by a selector circuit or a control circuit and hence, the circuit scale of the optical receiver is increased along with the increase of the rearrangement processing. Particularly, in high-speed transmission at a transmission rate exceeding 100 Gbps, a parallel number of 640 or more is estimated and hence, the increase in rearrangement processing significantly influences on the circuit scale. This phenomenon becomes a factor of difficulty in frame processing by existing devices such as the FPGA.

SUMMARY

According to an aspect of the embodiments, an optical receiver includes a reception module, a first detector, a second detector, a shift module, a first extraction module, and a second extraction module. The reception module receives a frame. The first detector detects a head position of a first layer, the head position being included in the frame received by the reception module. The second detector detects a head position of a second layer, the head position being included in the frame received by the reception module. The shift module shifts the frame so that the head position of the first layer and the head position of the second layer are located at respective predetermined positions, the head position of the first layer being detected by the first detector, the head position of the second layer being detected by the second detector. The first extraction module extracts a header of the first layer from the frame after the frame is shifted by the shift module. The second extraction module extracts a header of the second layer from the frame after the frame is shifted by the shift module.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. The optical receiver and the method of optical reception that are disclosed in the present application are not limited to the following embodiment.

Figure 1:
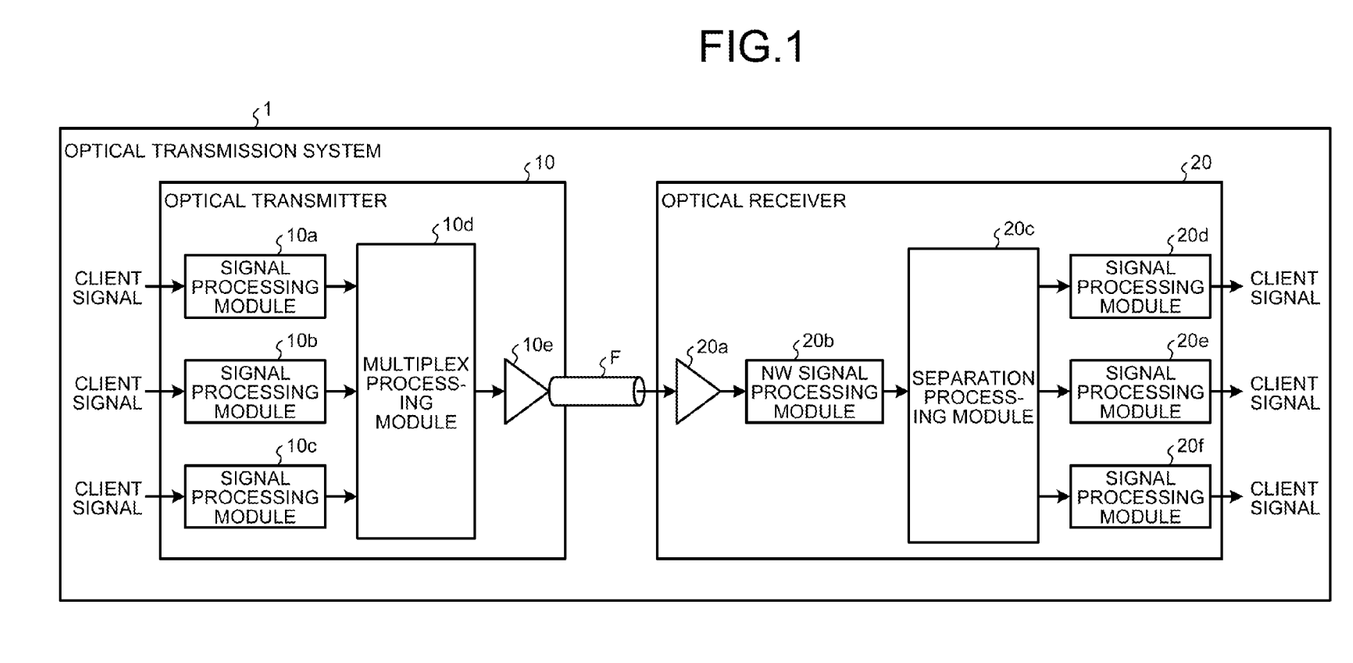
FIG. 1 is a view illustrating a configuration of an optical transmission system having an optical receiver according to the present embodiment.

First, the explanation is made with respect to the configuration of the optical receiver according to one embodiment disclosed in the present application. FIG. 1 is a view illustrating a configuration of an optical transmission system 1 having an optical receiver 20 according to the present embodiment. As illustrated in FIG. 1, in the optical transmission system 1, an optical transmitter 10 on the optical-signal transmitting side and the optical receiver 20 on the optical-signal receiving side are connected with each other by an optical fiber F.

The optical transmitter 10 has signal processing modules 10a, 10b, and 10c, a multiplex processing module 10d, and an electric/optic (E/O) converter 10e. The signal processing modules 10a, 10b, and 10c monitor and terminate received client signals and, at the same time, map the client signals to a frame (ODU frame) that can be processed on a network. The multiplex processing module 10d further multiplexes and maps a plurality of above-mentioned ODU frames to an ODU frame at a high rate and, at the same time, adds an FEC and an OH to the ODU frame. The E/O converter 10e converts an electrical signal into an optical signal. Here, the above-mentioned client signal is a signal that can be transmitted by the Ethernet (registered trademark), the Synchronous Optical NETwork (SONET), a fiber channel, or the like.

The optical receiver 20 has an optic/electric (O/E) converter 20a, a network (NW) signal processing module 20b, a separation processing module 20c, and a signal processing modules 20d, 20e, and 20f. The O/E converter 20a electrically converts and demodulates an optical signal received via the optical fiber F with a photo detector to restore an original electrical signal. The NW signal processing module 20b terminates the above-mentioned ODU frame. The separation processing module 20c separates and demaps the ODU frame multiplexed in the optical transmitter 10. Each of the signal processing modules 20d, 20e, and 20f maps the above-mentioned ODU frame to a client signal.

Figure 2:
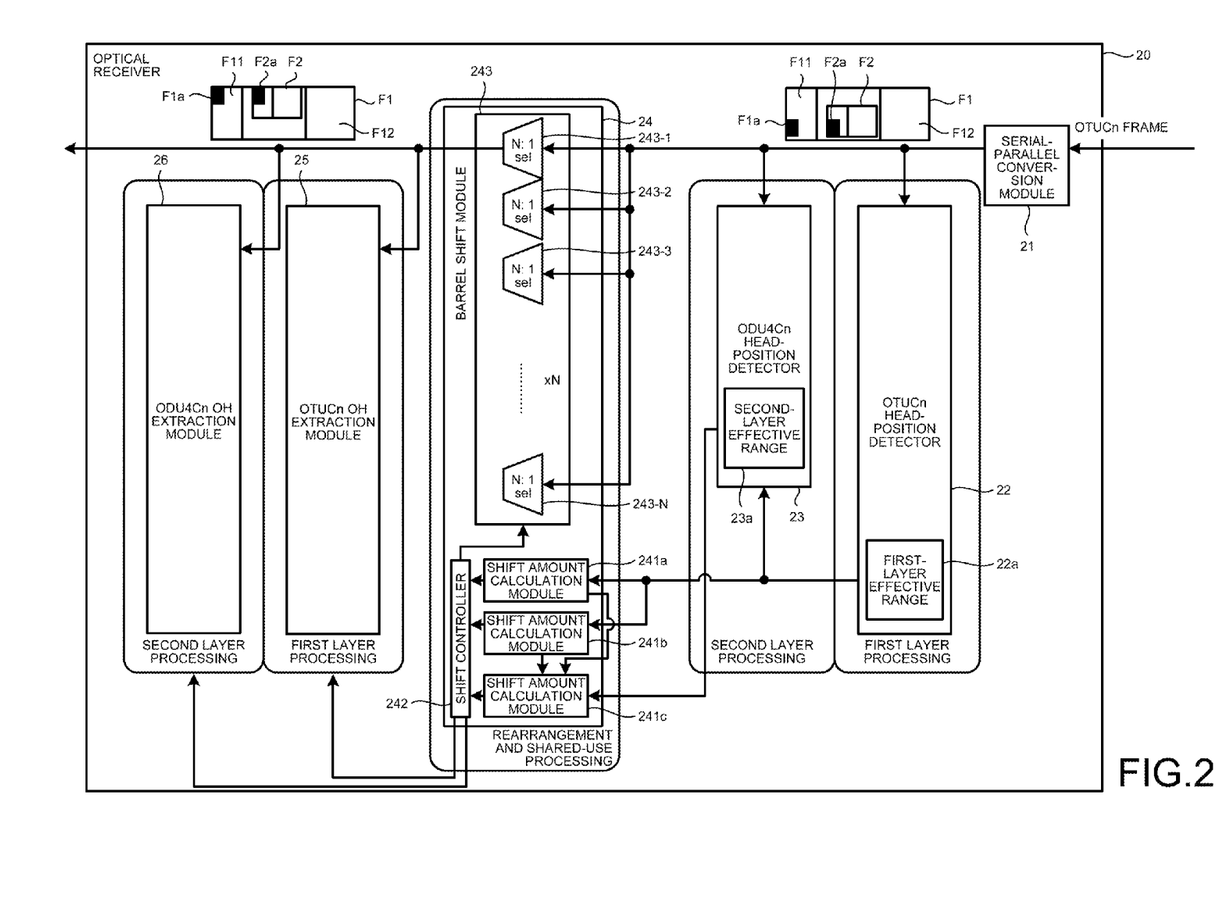
FIG. 2 is a block diagram illustrating a configuration of the optical receiver in the present embodiment.

Next, the configuration of the optical receiver 20 is explained more specifically. FIG. 2 is a block diagram illustrating the configuration of the optical receiver 20 in the present embodiment. As illustrated in FIG. 2, the optical receiver 20 has a serial-parallel conversion module 21, an OTUCn head-position detector 22, an ODU4Cn head-position detector 23, a barrel shift module 24, an OTUCn OH extraction module 25, and an ODU4Cn OH extraction module 26. The respective component modules are connected with each other in such a manner that a signal or data can unidirectionally or bidirectionally be input and output.

As illustrated in FIG. 2, an OTUCn frame F1 of a first layer (HO) has an OH part F11 at the head thereof, and has an FEC part F12 at the tail thereof. Furthermore, the OTUCn frame F1 has an ODU4Cn frame F2 of a second layer (LO) in the payload part thereof. Here, a filled portion (black portion) of the OTUCn frame F1 constitutes an FAS F1a that indicates the head position of the OTUCn frame F1. In the same manner as above, a filled portion (black portion) of the ODU4Cn frame F2 constitutes an FAS F2a that indicates the head position of the ODU4Cn frame F2.

The serial-parallel conversion module 21 performs parallel conversion of the respective four OTUCn frames F1 each of which has a clock rate of 100 Gbps to lower the clock rate so that the OTUCn frames F1 can be processed by a device (ASIC, FPGA, or the like) in the optical receiver 20. The OTUCn head-position detector 22 detects the head position of the OTUCn frame F1, and acquires first head-position information. The ODU4Cn head-position detector 23 specifies a second-layer effective range 23a based on the first head-position information and thereafter, detects the head position of the ODU4Cn frame F2 to acquire second head-position information from the second-layer effective range 23a.

The barrel shift module 24 uses the head-position information of the OTUCn frame F1 and the ODU4Cn frame F2 to change, for each layer, the shift amount (amount of shifting the head position) at the time of data rearrangement. Accordingly, the barrel shift module 24 is achieved by one circuit. To be more specific, the barrel shift module 24 has shift amount calculation modules 241a, 241b, and 241c, a shift controller 242, and a shift operation module 243.

The shift amount calculation module 241a uses the first head-position information to calculate the barrel shift amount for first rearrangement processing for extracting the OH of the first layer from the OTUCn frame F1. The shift amount calculation module 241b uses the first head-position information to calculate the barrel shift amount for deletion processing for deleting the OH part F11 and the FEC part F12 from the OTUCn frame F1. The shift amount calculation module 241c uses the second head-position information, the barrel shift amount for the first rearrangement processing, and the barrel shift amount for deletion processing to calculate the barrel shift amount for second rearrangement processing for extracting the OH of the second layer from the ODU4Cn frame F2.

The shift controller 242 controls the operation of the shift operation module 243 based on a shift amount input from each of the shift amount calculation modules 241a, 241b, and 241c. Furthermore, the shift controller 242 outputs the information that indicates the position of the OH of the first layer to the OTUCn OH extraction module 25. In the same manner as above, the shift controller 242 outputs the information that indicates the position of the OH of the second layer to the ODU4Cn OH extraction module 26.

The shift operation module 243 has N:1 selectors 243-1 to 243-N, and performs, in a first-layer effective range 22a, a first shift operation based on the barrel shift amount for the first rearrangement processing and the barrel shift amount for the deletion processing. Furthermore, the shift operation module 243 performs, in the second-layer effective range 23a, a second shift operation based on the barrel shift amount for the second rearrangement processing. Here, N is an integer equal to or greater than 2; for example, 128.

The OTUCn OH extraction module 25 performs, in accordance with the above-mentioned first shift operation, OH processing using the information that indicates the position of the OH in the first layer. The ODU4Cn OH extraction module 26 performs, in accordance with the above-mentioned second shift operation, OH processing using the information that indicates the position of the OH in the second layer.

Subsequently, the operation of the optical receiver 20 is explained with reference to FIG. 3 to FIG. 6A.

Figure 3:
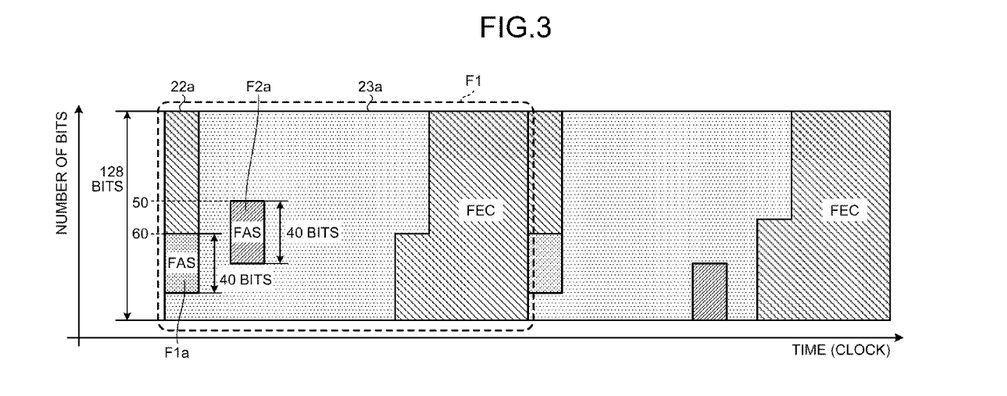
FIG. 3 is a view illustrating an example of a data configuration of an OTUCn frame received by the optical receiver.

FIG. 3 is a view illustrating an example of the data configuration of the OTUCn frame F1 received by the optical receiver 20. In FIG. 3, a time (clock) is taken on an x axis (axis of abscissas), and the number of bits is taken on a y axis (axis of ordinate). The present embodiment focuses on the OTUCn frame F1 that is an OTUCn frame for one clock. In the OTUCn frame F1, a rectangular region illustrated by hatched lines and dots corresponds to the first-layer effective range 22a, and a region illustrated by dots corresponds to the second-layer effective range 23a. As illustrated in FIG. 3, in the first-layer effective range 22a, the FAS F1a of the first layer is set by taking a 60th bit as a head position. In the same manner as above, in the second-layer effective range 23a, the FAS F2a of the second layer is set by taking a 50th bit as a head position. Here, each of the FAS F1a and the FAS F2a of the respective layers has a bit width of 40 bits.

The OTUCn frame F1 illustrated in FIG. 3 is formed of a layered structure having the first layer and the second layer. The OTUCn frame F1 is received by the optical receiver 20 and thereafter, parallel processing is performed with respect to the OTUCn frame F1 for every 128 bits.

Figure 4A:
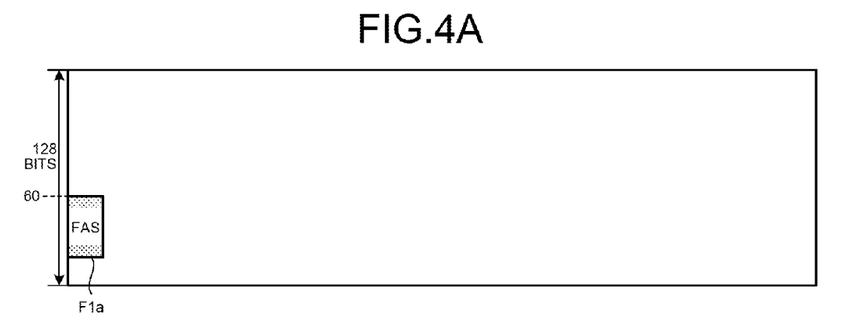
FIG. 4A is a view illustrating a manner that the head position of a first layer is detected in the OTUCn frame.

FIG. 4A is a view illustrating a manner that the head position of the first layer is detected in the OTUCn frame F1. As illustrated in FIG. 4A, the OTUCn head-position detector 22 of the optical receiver 20 detects the FAS F1a that indicates the head position of the first layer in the first-layer effective range 22a of the OTUCn frame F1. Here, in FIG. 4A, although the OTUCn frame F1 for 1 clock is exemplified, the detection of the FAS F1a is performed for each clock.

Figure 4B:
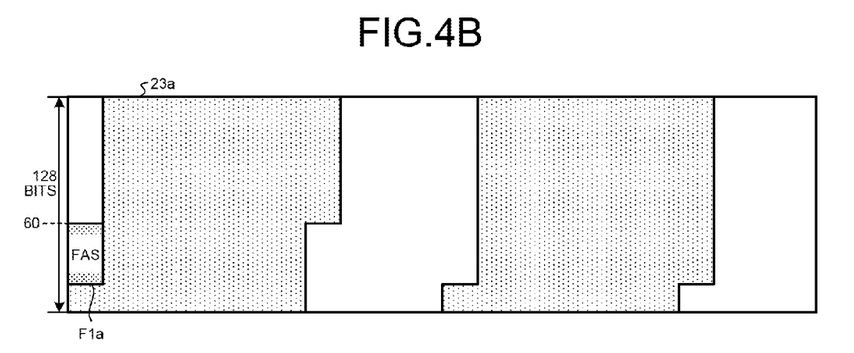
FIG. 4B is a view illustrating a manner that the effective range of a second layer is specified from the OTUCn frame.

FIG. 4B is a view illustrating a manner that the effective range of the second layer is specified from the OTUCn frame Fi. As illustrated in FIG. 4B, the ODU4Cn head-position detector 23 of the optical receiver 20 specifies, based on the position of the detected FAS F1a and the position of the FEC, the second-layer effective range 23a from the first-layer effective range 22a of the OTUCn frame F1.

Figure 4C:
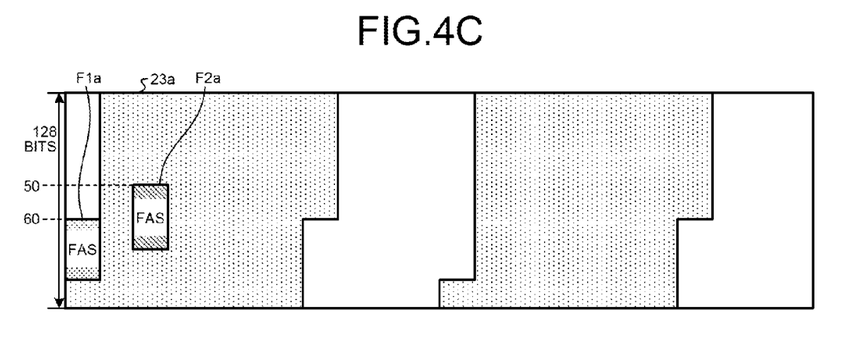
FIG. 4C is a view illustrating a manner that the head position of the second layer is detected in the OTUCn frame.

FIG. 4C is a view illustrating a manner that the head position of the second layer is detected in the OTUCn frame F1. As illustrated in FIG. 4C, the ODU4Cn head-position detector 23 of the optical receiver 20 detects the FAS F2a that indicates the head position of the second layer in the specified second-layer effective range 23a. Here, in FIG. 4C, although the OTUCn frame F1 for 1 clock is exemplified, the detection of the FAS F2a is performed for each clock.

Figure 5A:
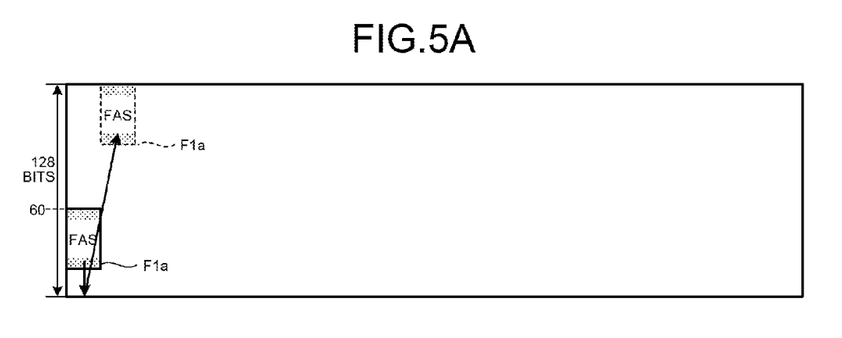
FIG. 5A is a view illustrating a manner that a barrel shift amount for first rearrangement processing is calculated from the OTUCn frame.

FIG. 5A is a view illustrating a manner that a barrel shift amount for the first rearrangement processing is calculated from the OTUCn frame F1. As illustrated in FIG. 5A, the shift amount calculation module 241a of the optical receiver 20 uses the FAS F1a (see FIG. 4A) that indicates the head position of the first layer to calculate the shift amount (the barrel shift amount for the first rearrangement processing) for shifting the FAS F1a to an MSB. In the example illustrated in FIG. 5A, since the FAS F1a starts from the 60th bit, the shift amount calculation module 241a sets the above-mentioned shift amount to +69 (=129-60) bits thus moving the FAS F1a to the position of the MSB.

Figure 5B:
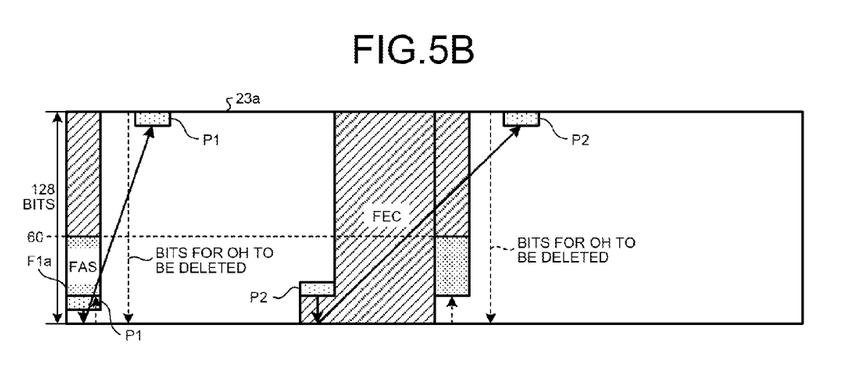
FIG. 5B is a view illustrating a manner that a barrel shift amount for deletion is calculated from the OTUCn frame.

FIG. 5B is a view illustrating a manner that the barrel shift amount for the deletion processing is calculated from the OTUCn frame F1. As illustrated in FIG. 5B, the shift amount calculation module 241b of the optical receiver 20 uses the FAS F1a (see FIG. 4A) that indicates the head position of the first layer to calculate the shift amount (the barrel shift amount for the deletion processing) for deleting the OH and the FEC of the first layer from the first-layer effective range 22a of the OTUCn frame F1. That is, the shift amount calculation module 241b calculates a shift amount such that a pointer P1 that indicates the head position of the second layer is located at the position of the MSB even when the OH and the FEC are deleted. In the example illustrated in FIG.

5B, since the FAS F1a starts from the 60th bit, the shift amount calculation module 241b sets the above-mentioned shift amount to +157 (=129−(60+40)+128) bits thus moving the pointer P1 to the position of the MSB. In the same manner as above, the shift amount calculation module 241b calculates a shift amount such that a pointer P2 that indicates the head position of a subsequent first layer is located at the position of the MSB even when the OH and the FEC are deleted. In the example illustrated in FIG. 5B, since the FAS F1a starts from the 60th bit, the shift amount calculation module 241b sets the above-mentioned shift amount to +669 (=129−(60+40)+128*5) bits thus moving the pointer P2 to the position of the MSB.

Figure 5C:
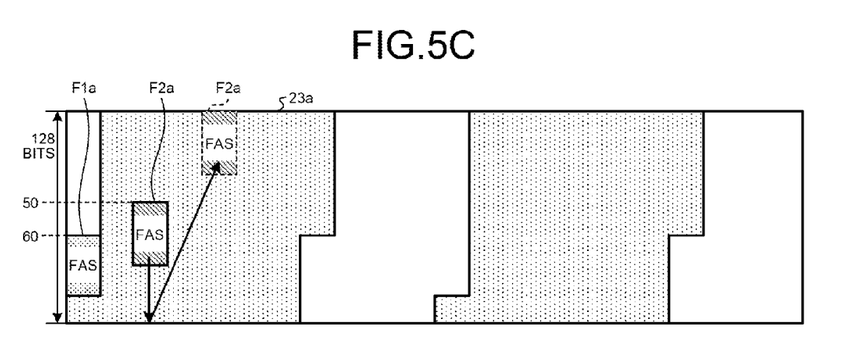
FIG. 5C is a view illustrating a manner that a barrel shift amount for second rearrangement processing is calculated from the OTUCn frame.

FIG. 5C is a view illustrating a manner that a barrel shift amount for the second rearrangement processing is calculated from the OTUCn frame F1. As illustrated in FIG. 5C, the shift amount calculation module 241c of the optical receiver 20 uses the FAS F2a (see FIG. 4C), the barrel shift amount for the first rearrangement processing (see FIG. 5A), and the barrel shift amount for the deletion processing (see FIG. 5B) to calculate a shift amount (the barrel shift amount for the second rearrangement processing) for shifting the FAS F2a to the MSB. In the example illustrated in FIG. 5C, since the FAS F2a starts from the 50th bit, the shift amount calculation module 241c sets the above-mentioned shift amount to +207 (=129−50+128) bits thus moving the FAS F2a to the position of the MSB. To be more specific, the barrel shift amount for the deletion processing is a shift amount for rearranging the second-layer effective range 23a so that 128-bit parallel data is formed in a rectangular shape. Therefore, the barrel shift amount for the second rearrangement processing is calculated by adding a value (79 bits) obtained by subtracting the bit position (50 bits) of the FAS F2a from 129 bits to the shift amount (128 bits).

Figure 6A:
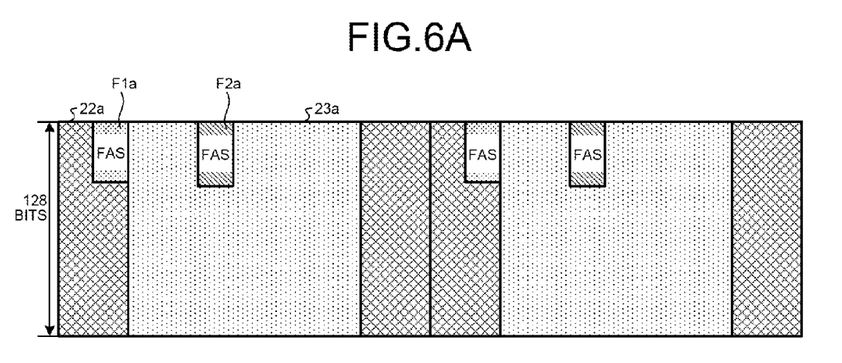
FIG. 6A is a view illustrating a manner that the OTUCn frame of the first layer and the ODU4Cn frame of the second layer are shifted.

FIG. 6A is a view illustrating a manner that the OTUCn frame F1 of the first layer and the ODU4Cn frame F2 of the second layer are shifted. As illustrated in FIG. 6A, the shift operation module 243 of the optical receiver 20 shifts the OH of the first layer with respect to the data row that constitutes the OTUCn frame F1 in accordance with the barrel shift amount for the first rearrangement processing (see FIG. 5A). Furthermore, the shift operation module 243 deletes the FEC from the OTUCn frame F1 in accordance with the barrel shift amount for the deletion processing (see FIG. 5B). In addition, the shift operation module 243 shifts the OH of the second layer other than the OH and the FEC of the first layer in accordance with the barrel shift amount for the second rearrangement processing (see FIG. 5C). As a result, each of the OH of the first layer and the OH of the second layer is located at the head position (at the position of the MSB) of the 128-bit parallel data.

Figure 6B:
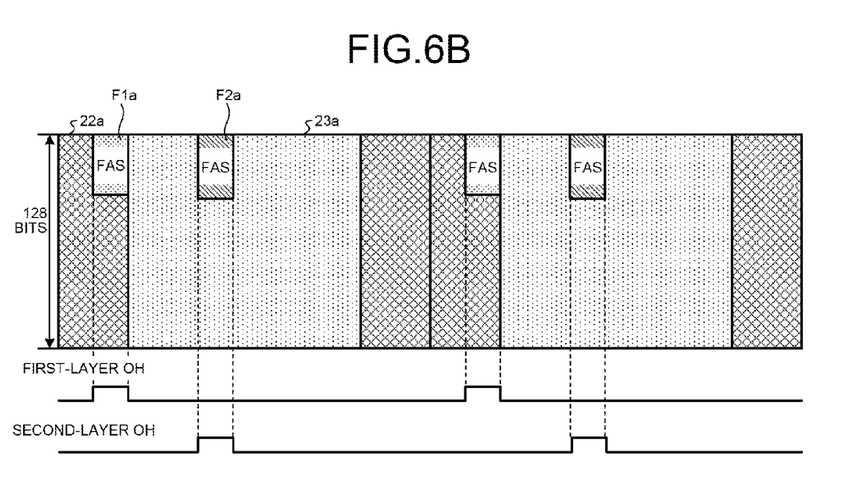
FIG. 6B is a view illustrating a manner that a signal indicating the position of the OH of each of the first layer and the second layer is generated.

FIG. 6B is a view illustrating a manner that a signal indicating the position of the OH of each of the first layer and the second layer is generated. As illustrated in FIG. 6B, the shift controller 242 of the optical receiver 20 uses the barrel shift amount for the first rearrangement processing (see FIG. 5A), the barrel shift amount for the deletion processing (see FIG. 5B), and the barrel shift amount for the second rearrangement processing (see FIG. 5C) to generate a signal that indicates the OH position of each layer. To be more specific, with respect to the first layer, the shift controller 242 uses the barrel shift amount for the first rearrangement processing and the barrel shift amount for the deletion processing to generate, based on the FAS F1a of the OTUCn frame F1, a first auxiliary signal whereby the OTUCn OH extraction module 25 specifies the position of the OH of the first layer. Subsequently, with respect to the second layer, the shift controller 242 uses the barrel shift amount for the second rearrangement processing to generate, based on the FAS F2a of the ODU4Cn frame F2, a second auxiliary signal whereby the ODU4Cn OH extraction module 26 specifies the position of the OH of the second layer.

Next, the OTUCn OH extraction module 25 specifies the position of the OH of the first layer by the above-mentioned first auxiliary signal, and extracts the OH that is an object of the OH processing from the OTUCn frame F1. The ODU4Cn OH extraction module 26 specifies the position of the OH of the second layer by the above-mentioned second auxiliary signal, and extracts the OH that is an object of the OH processing from the ODU4Cn frame F2. The OH extracted from each layer is used for signal processing (OH processing) for maintenance, monitoring, or the like.

As explained heretofore, the optical transmission system 1 has the optical transmitter 10 and the optical receiver 20. The optical receiver 20 has the serial-parallel conversion module 21, the OTUCn head-position detector 22, the ODU4Cn head-position detector 23, the barrel shift module 24, the OTUCn OH extraction module 25, and the ODU4Cn OH extraction module 26. The serial-parallel conversion module 21 receives the OTUCn frame F1. The OTUCn head-position detector 22 detects a head position of the first layer, the head position being included in the OTUCn frame F1 received by the serial-parallel conversion module 21. The ODU4Cn head-position detector 23 detects a head position of the second layer, the head position being included in the OTUCn frame F1 received by the serial-parallel conversion module 21. The barrel shift module 24 shifts the OTUCn frame F1 so that the head position of the above-mentioned first layer that is detected by the OTUCn head-position detector 22 and the head position of the above-mentioned second layer that is detected by the ODU4Cn head-position detector 23 are located at respective predetermined positions. The OTUCn OH extraction module 25 extracts the header of the above-mentioned first layer from the OTUCn frame F1 after the OTUCn frame F1 is shifted by the barrel shift module 24. The ODU4Cn OH extraction module 26 extracts the header of the above-mentioned second layer from the OTUCn frame F1 after the OTUCn frame F1 is shifted by the barrel shift module 24.

That is, the optical receiver 20 achieves the rearrangement (shift) processing of a frame through the shared use of one barrel shift circuit with respect to the OTUCn of the first layer and the ODU4Cn of the second layer. Accordingly, first to third rearrangement processing (see FIG. 8) that has been performed by three circuits can be performed by one circuit (barrel shift module 24). Therefore, the optical receiver 20 can reduce a circuit scale while maintaining a related frame processing function. As a result, the reduction of power consumption or cost can be achieved. To be more specific, for example, the reduction of the circuit scale achieves the optical receiver 20 with the use of one-chip FPGA, while the optical receiver 20 has been achieved only by two-chip FPGA. Accordingly, the packaging area of a printed circuit board (PCB) that mounts the FPGA thereon is reduced thus achieving the reduction of a packaging-design man hour. Power consumption can also be reduced by an amount of power consumption for one-chip FPGA (approximately 10 W, for example).

Here, in the above-mentioned embodiment, the optical transmission system 1 imposes no restriction on a head (FAS) insertion position on the side of mapping. However, with respect to the head position of the first layer or the head position of the second layer, the restriction may be imposed on a bit position before the reception of the OTUCn frame F1. The optical transmission system 1 imposes such a restriction thus reducing the number of the N:1 selectors included in the shift operation module 243 of the optical receiver 20 on the side of demapping. As a result, further reduction can be achieved in circuit scale. For example, on the side of mapping, the optical transmitter 10 may impose the restriction on the above-mentioned head insertion position so that the head insertion position is located at a bit position in eight-bit steps; that is, 1, 9, 17, . . . 113, 121 in 128 parallel bits. In this aspect, the number of the above-mentioned N:1 selectors requested for the data rearrangement operation on the side of demapping is theoretically decreased to one eighth (from 128 to 16, for example). In connection with this, the circuit scale of the shift operation module 243 in the optical receiver 20 can be reduced to one eighth. Furthermore, the above-mentioned restriction is not always imposed on the head position of the first layer, and may be imposed on the head position of the second layer or on the head positions of both layers.

The optical receiver 20 according to the above-mentioned embodiment is applicable not only to a Beyond100G transmission frame but also to the existing transmission frame. That is, the OTUCn frame F1 of the first layer may be, for example, an OTUk frame specified in the existing OTN standard (ITU-T G.709). In the same manner as above, the ODU4Cn frame F2 of the second layer may be, for example, an ODUj frame specified in the above-mentioned OTN standard. Here, j<k. Although a frame is assumed as a protocol data unit (PDU) in the above-mentioned embodiment, the frame is not limited to this example. For example, the above-mentioned embodiment may be applied to the other PDU such as a packet of the transmission control protocol/Internet protocol (TCP/IP), a cell of the asynchronous transfer mode (ATM), or the like, depending on a network type. Furthermore, although the number of layers is set to two in the above-mentioned embodiment, three or more layers may be applicable. In addition, it is unnecessary to adopt a hierarchical structure as a layer structure, and a nesting structure or the like may be applicable.

The numbers of bits of the parallel data that constitutes the OTUCn frame F1 is not limited to 128 bits, and the other number of bits (64 bits, 256 bits, or the like) may also be applicable.

Furthermore, in the above-mentioned embodiment, it is unnecessary to arrange each of constitutional features in the optical receiver 20 physically as illustrated in the drawings. That is, the specific configuration of distribution and integration of the respective constitutional features is not limited to the examples illustrated in the drawings, and all or a part of the constitutional features may be functionally or physically constituted in a distributed or integrated manner in arbitrary units depending on various kinds of loads, use conditions, or the like. For example, the shift amount calculation module 241a and the shift amount calculation module 241b of the barrel shift module 24, or the shift controller 242 and the shift operation module 243 may be integrated as one constitutional feature. On the other hand, the shift operation module 243 may be separated into a module that performs the first shift operation based on the barrel shift amount for the first rearrangement processing and the barrel shift amount for the deletion processing, and a module that performs the second shift operation based on the barrel shift amount for the second rearrangement processing. In addition, a memory that stores a frame or a shift amount may be connected to the optical receiver 20 via a network or a cable as an external device of the optical receiver 20.

One aspect of an optical receiver disclosed in the present application can reduce a circuit scale.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical receiver comprising:
    a reception module that receives a frame;
    a first detector that detects a head position of a first layer, the head position being included in the frame received by the reception module;
    a second detector that detects a head position of a second layer, the head position being included in the frame received by the reception module;
    a shift module that shifts, based on a shift amount input for each layer, the frame so that the head position of the first layer and the head position of the second layer are located at respective predetermined positions, the head position of the first layer being detected by the first detector, the head position of the second layer being detected by the second detector, the shift module using the head position of the first layer, the head position of the second layer, a first shift amount for extracting the header of the first layer from the frame, and a second shift amount for deleting the header of the first layer from the frame to shift the frame;
    a first extraction module that extracts a header of the first layer from the frame after the frame is shifted by the shift module; and
    a second extraction module that extracts a header of the second layer from the frame after the frame is shifted by the shift module.

2. The optical receiver according to claim 1, wherein the shift module uses the first shift amount and the second shift amount to generate a first signal by which the first extraction module specifies the position of the header of the first layer, and uses a third shift amount for extracting the header of the second layer from the frame to generate a second signal by which the second extraction module specifies the position of the header of the second layer.

3. An optical receiver comprising:
    a reception module that receives a frame;
    a first detector that detects a head position of a first layer, the head position being included in the frame received by the reception module;
    a second detector that detects a head position of a second layer, the head position being included in the frame received by the reception module;
    a shift module that shifts, based on a shift amount input for each layer, the frame so that the head position of the first layer and the head position of the second layer are located at respective predetermined positions, the head position of the first layer being detected by the first detector, the head position of the second layer being detected by the second detector, with respect to the head position of the first layer or the head position of the second layer, restriction being imposed on a bit position before the frame is received;
a first extraction module that extracts a header of the first layer from the frame after the frame is shifted by the shift module; and
a second extraction module that extracts a header of the second layer from the frame after the frame is shifted by the shift module.

4. An optical receiver comprising:
a reception module that receives a frame, the frame including an OTUCn frame in the first layer, the frame including an ODU4Cn frame in the second layer;
a first detector that detects a head position of a first layer, the head position being included in the frame received by the reception module;
a second detector that detects a head position of a second layer, the head position being included in the frame received by the reception module;
a shift module that shifts, based on a shift amount input for each layer, the frame so that the head position of the first layer and the head position of the second layer are located at respective predetermined positions, the head position of the first layer being detected by the first detector, the head position of the second layer being detected by the second detector;
a first extraction module that extracts a header of the first layer from the frame after the frame is shifted by the shift module; and
a second extraction module that extracts a header of the second layer from the frame after the frame is shifted by the shift module.

5. A method of optical reception comprising:
receiving a frame;
detecting a head position of a first layer, the head position being included in the frame that has been received;
detecting a head position of a second layer, the head position being included in the frame that has been received;
shifting, based on a shift amount input for each layer, the frame so that the head position of the first layer and the head position of the second layer are located at respective predetermined positions, the head position of the first layer being detected, the head position of the second layer being detected, the shifting using the head position of the first layer, the head position of the second layer, a first shift amount for extracting the header of the first layer from the frame, and a second shift amount for deleting the header of the first layer from the frame to shift the frame;
extracting a header of the first layer from the frame after the frame is shifted; and
extracting a header of the second layer from the frame after the frame is shifted.

6. A method of optical reception comprising:
receiving a frame;
detecting a head position of a first layer, the head position being included in the frame that has been received;
detecting a head position of a second layer, the head position being included in the frame that has been received;
shifting, based on a shift amount input for each layer, the frame so that the head position of the first layer and the head position of the second layer are located at respective predetermined positions, the head position of the first layer being detected, the head position of the second layer being detected, with respect to the head position of the first layer or the head position of the second layer, restriction being imposed on a bit position before the frame is received;
extracting a header of the first layer from the frame after the frame is shifted; and
extracting a header of the second layer from the frame after the frame is shifted.

7. A method of optical reception comprising:
receiving a frame including an OTUCn frame in the first layer and an ODU4Cn frame in the second layer;
detecting a head position of a first layer, the head position being included in the frame that has been received;
detecting a head position of a second layer, the head position being included in the frame that has been received;
shifting, based on a shift amount input for each layer, the frame so that the head position of the first layer and the head position of the second layer are located at respective predetermined positions, the head position of the first layer being detected, the head position of the second layer being detected;
extracting a header of the first layer from the frame after the frame is shifted; and
extracting a header of the second layer from the frame after the frame is shifted.

* * * * *